Feb. 19, 1957  M. C. VIVIAN  2,781,814
ANTI-SKID TIRE CHAIN AND FASTENING MEANS THEREFOR
Filed Jan. 13, 1955  2 Sheets-Sheet 1
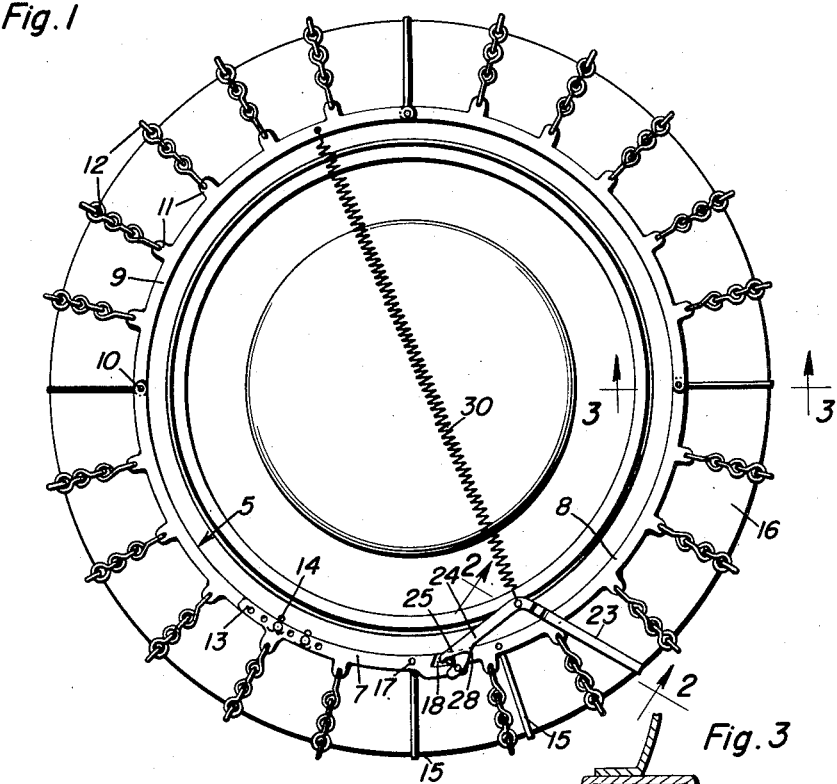
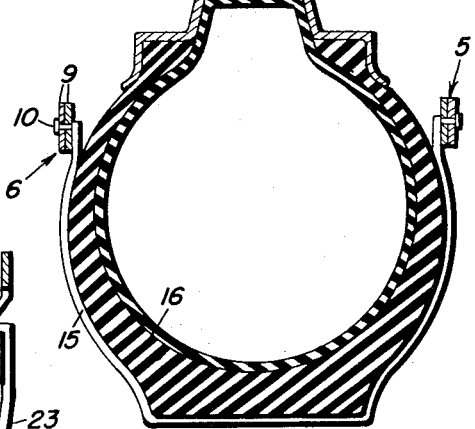
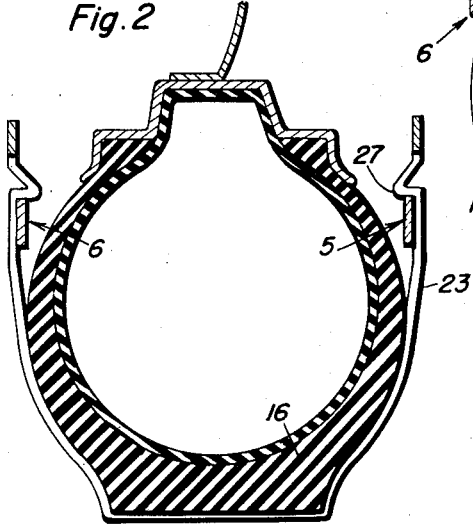
Merel C. Vivian
INVENTOR.

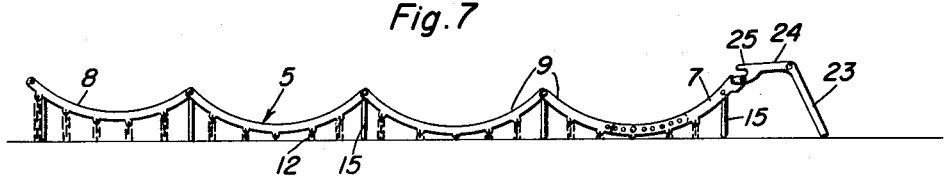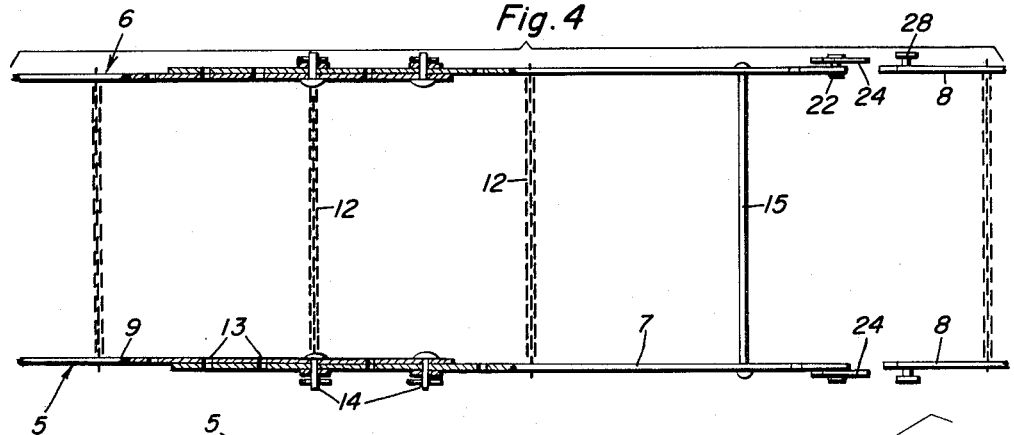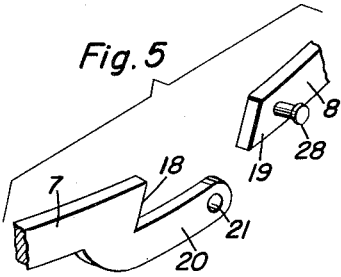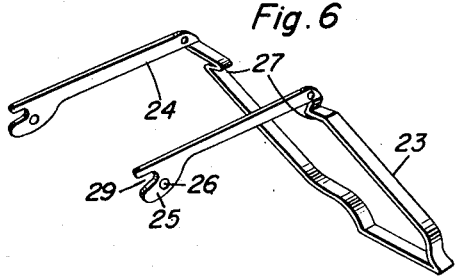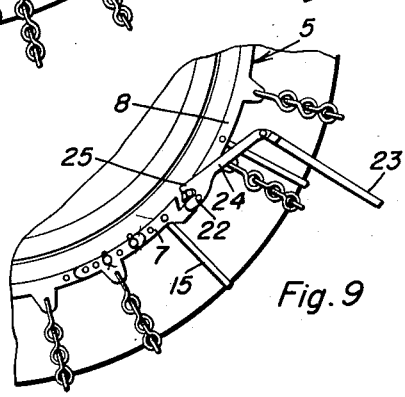
Merel C. Vivian
INVENTOR.

United States Patent Office 2,781,814
Patented Feb. 19, 1957

2,781,814

ANTI-SKID TIRE CHAIN AND FASTENING MEANS THEREFOR

Merel C. Vivian, McDonald, Ohio

Application January 13, 1955, Serial No. 481,538

3 Claims. (Cl. 152—242)

The present invention relates to new and useful improvements in anti-skid chains constructed with means for easily and quickly mounting the same on the tire of an automobile or other motor vehicle either manually or automatically.

An important object of the invention is to provide an anti-skid chain composed of a pair of sectional side rings positioned at the opposite sides of a tire and to which the cross links are connected and equipping the sections of the rings with resilient substantially U-shaped clips for gripping the tire to feed the chain over the top of the tire as the wheel is turned.

Another object of the invention is to provide means for easily and quickly latching the ends of the sectional rings to each other in assembled position on the tire.

A still further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a side elevational view showing the anti-skid chain mounted on a tire;

Figures 2 and 3 are transverse sectional views taken respectively on the lines 2—2 and 3—3 of Figure 1;

Figure 4 is a fragmentary top plan view with parts broken away and shown in section;

Figure 5 is a fragmentary group perspective view of the interfitting connection for the ends of the sectional rings;

Figure 6 is an enlarged perspective view of the latching device for the rings;

Figure 7 is a side elevational view showing the chain resting on the ground for rolling a tire thereon;

Figure 8 is a fragmentary side elevational view showing the latching clip ready for latching movement; and Figure 9 is a similar view showing the latching clip locking the ends of the rings on the tire.

Referring now to the drawings in detail wherein for the purpose of illustration I have disclosed a preferred embodiment of the invention, the numerals 5 and 6 designate a pair of sectional rings of duplicate construction and each including end sections 7 and 8 and a plurality of intermediate sections 9 all of arcuate construction and with the ends of the end section 8 and the ends of the intermediate sections 9 pivoted to each other in overlapping relation by pins, rivets or the like 10.

Each section of the rings is formed with radially outwardly projecting apertured ears 11 to which cross chains 12 are secured to connect the pair of rings 5 and 6 to each other.

The end section 7 and the adjacent intermediate section 9 are positioned in overlapping relation with respect to each other and with their overlapping portions formed with aligned openings 13 to selectively receive fastening pins or the like 14 to secure the end section 7 in extensibly adjusted relation with respect to its adjacent intermediate section 9 to increase or decrease the circumference of the ring.

A plurality of resilient substantially U-shaped clips 15 have their end portions secured to the rivets or pins 10 at the connections for the several sections of the ring and are adapted for gripping an automobile tire 16 to feed the chain circumferentially on the tire. A pair of the clips 15 are attached adjacent the free end portions of the end sections 7 and 8 of the rings by rivets or the like 17.

The free end portion of the end section 7 is formed with a substantially V-shaped notch 18 and the free end portion of the end section 8 is formed with a correspondingly shaped tip 19 to enter the notch 18 in interfitting matching relation therewith. An extension 20 is formed on the end portion 7 which projects outwardly beyond the notch 18 and is formed with an opening 21 to receive a headed pin or rivet 22 to be fixed therein for mounting on the extension 20 as shown in Figures 8 and 9.

A resilient U-shaped latching clip 23 is provided at its end portions with a pair of inclined latching arms 24 positioned angularly with respect to the adjacent leg portions of the clip. The free end portions of the arms 24 are formed with a fork 25 each having an opening 26 therein for pivotally mounting on the pin or rivet 22. The leg portions of the clips 23 are formed with inwardly projecting shoulders 27 to engage the end section 8 of the ring when the clip 23 is placed on the tire. The free end portion of the end section 8 is provided with an outwardly projecting headed pin 28 for latching engagement in the notch 29 of the adjacent fork 25 of the latching arms 24.

In applying the tire chain to the tire of a vehicle wheel, the chain is placed on the ground in the manner indicated in Figure 7 of the drawings, and the clip 15 adjacent the end portion of the ring section 8 gripped to the tire and the wheel is then rolled over the chain in a direction to feed the chain over the top of the tire. During this feeding movement of the chain the remaining clips 15 are also snapped onto the tire to tightly hold the ring sections 9 and the cross links 12 thereon and as the end section 7 engages the tire the extension 19 of the section 8 will be aligned with notch 18 to enter the notch in interlocking engagement therewith. The latching clip 23 is then swung upwardly on its pivot 22 either manually or by the weight of the tire to snap the clip onto the tire and over the end sections 8 of the rings and locked thereto by the shoulders 27. The swinging movement of the latching clip swings the forks 25 into latching engagement with the pins 28 as shown in Figure 9. The latching clip 23 is then retained in its locked position by a coil spring 30 attached at the angle of clip 23 and arms 24 and extending at the outer side of the tire to a substantially diametrically opposite side of the outermost rings.

From the foregoing, the construction and operation of the device will be readily understood and further explanation is believed to be unnecesary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An anti-skid device for tires comprising a pair of sectional rings adapted for mounting circumferentially at the opposite sides of a tire, cross chains connecting the rings to each other, said rings including a pair of end sections and at least one intermediate section pivotally connected to each side section, a resilient substantially U-shaped clip adapted to grip the tire, arms on the clip pivoted to one of said end sections, a laterally projecting pin carried by the other of said end sections, and a fork-shaped latching member carried by said arms lockably engaging said pin in the fork thereof.

2. An anti-skid device for tires comprising a pair of sectional rings adapted for mounting circumferentially at the opposite sides of a tire, cross chains connecting the rings to each other, said rings including a pair of end sections and at least one intermediate section pivotally connected to each side section, a resilient substantially U-shaped clip adapted to grip the tire, said clip including leg porions, opposing shoulders on the leg portions of the clip between which the rings are engaged to lock the clip thereto, arms projecting at an angle to said leg portions of the clip and pivoted at their end portions to one of said end sections, and latching means carried by the arms and lockably engaging the other of said end sections.

3. The construction of claim 2 and including a coil spring connected to said clip and also connected to a substantially diametrically opposite portion of one of the rings.

References Cited in the file of this patent

UNITED STATES PATENTS

| | | |
|---|---|---|
| 1,311,048 | Cramer | July 22, 1919 |
| 2,443,219 | Backe | June 15, 1948 |
| 2,608,234 | Hughes | Aug. 26, 1952 |